United States Patent [19]
Brown et al.

[11] Patent Number: 6,051,964
[45] Date of Patent: Apr. 18, 2000

[54] SECTIONALIZED POWER REGULATOR SEPARATED BETWEEN AN OUTPUT INDUCTOR AND AN OUTPUT CAPACITOR

[75] Inventors: Alan E. Brown, Georgetown; Vahid Samiee, Austin, both of Tex.

[73] Assignee: Dell USA LP, Round Rock, Tex.

[21] Appl. No.: 09/237,006

[22] Filed: Jan. 25, 1999

[51] Int. Cl.[7] ........................................................ G05F 1/40
[52] U.S. Cl. ........................................................... 323/288
[58] Field of Search ............................ 361/111; 323/282, 323/283, 288

[56] References Cited

U.S. PATENT DOCUMENTS

| | | | |
|---|---|---|---|
| 4,580,089 | 4/1986 | Grünsch et al. | 323/287 |
| 5,073,849 | 12/1991 | Morris | 363/21 |
| 5,570,276 | 10/1996 | Cuk et al. | 363/16 |
| 5,610,807 | 3/1997 | Kanda et al. | 363/43 |
| 5,705,922 | 1/1998 | VanDyke | 323/354 |
| 5,723,975 | 3/1998 | Rogers | 324/72.5 |
| 5,864,457 | 1/1999 | Kates et al. | 361/111 |

*Primary Examiner*—Shawn Riley
*Attorney, Agent, or Firm*—Skjerven Morrill Macpherson Franklin & Friel LLP

[57] ABSTRACT

By separating a power regulator at a point between the output inductor and the output capacitor of the regulator, the capacitive output section can be located close to a processor (or other load device) while the remaining portion of the regulator can be placed in another location away from the processor. With the capacitive output section located close to the processor and valuable system board space can be saved.

22 Claims, 4 Drawing Sheets

SECTIONALIZED POWER REGULATOR SEPARATED BETWEEN AN OUTPUT INDUCTOR AND AN OUTPUT CAPACITOR

BACKGROUND OF THE INVENTION

1. Field of the Invention

This invention relates to electronic devices, including computer systems, and more particularly to electronic devices employing DC to DC power conversion.

2. Description of the Related Art

Personal computer systems in general and Intel/Microsoft compatible personal computer systems in particular have attained widespread acceptance. The term compatible is used to denote those computer systems employing microprocessor and chip set hardware supplied by Intel Corporation and operating system software supplied by Microsoft Corporation. These personal computer systems now provide computing power to many segments of today's modern society. A personal computer system can usually be defined as a desktop, floor-standing, or portable computer that includes a system unit having a processor with associated volatile and non-volatile memory, a display monitor, a keyboard, one or more floppy diskette drives, a mass storage device, an optional CD-ROM or DVD drive and an optional printer. One of the distinguishing characteristics of these systems is the use of a system board or motherboard to electrically connect these components together. These computer systems are information handling systems which are designed primarily to provide independent computing power to a single user, (or a relatively small group of users in the case of computer systems which serve as server systems.) Computer systems (and electronic devices generally) typically include a power supply which converts AC main power (120 volts in the United States, and 220 volts in many other countries) down to a smaller DC voltage useful for supplying the various components of the computer system. Different components of the computer system often have different DC voltage requirements. For example, the power rail which supplies an appropriate DC voltage to the processor of the computer system may have one voltage requirement. The L2 cache associated with the processor may have another voltage requirement while the system bus and peripherals may have still other voltage requirements. Computer systems typically include several DC to DC converters or regulators to down convert one DC voltage from the power supply to respective voltages used by the particular components of the computer system.

A conventional switched mode DC to DC buck regulator useful for this purpose is depicted in FIG. 1 as regulator 100. Regulator 100 includes a switching transistor 110 to which an input DC voltage $V_{IN}$ is provided. A free-wheeling diode 120 is coupled between the emitter of switching transistor 110 and ground. An inductor 130, with an inductance of 1 to 10 μH for example, is coupled between load 150 and the node joining the emitter of transistor 110 and diode 120. The regulator produces an output voltage $V_{OUT}$ at node 160. A switch control circuit 180 (e.g., a pulse width modulator integrated circuit, or a voltage controlled oscillator) is coupled between output node 160 and the input or base of switching transistor 110. Switch control circuit 180 senses the output voltage $V_{OUT}$ as the load 150 varies and appropriately adjusts the switching frequency of transistor 110 by, for example, adjusting the pulse width of the control signal applied to switching transistor 110 to dynamically regulate the output voltage $V_{OUT}$ to the desired value.

During normal operation, the load presented to a DC to DC regulator can have minor to major current fluctuations. For example, the DC to DC regulator which supplies power to a processor will experience high frequency load fluctuations at the processor switching rate which is in the MHz range. The average load current can be substantially constant with minor fluctuations or can change dramatically due to a change in processor state condition such as transitioning from a sleep state to a fully active state.

Thus, the DC to DC regulator must be able to deal with both major and minor fluctuations in load current. The system bus and other buses of the system experience significant changes in operating current as well. Moreover, other I/O devices in the system, such as hard drives, floppy drives, CD ROMs, DVDs also present varying current requirements. It is important that a DC to DC regulator be able to provide relatively constant DC output voltage as the load dynamically changes.

Conventional DC to DC buck regulator 100 responds to load changes in the following manner. DC to DC buck regulator 100 includes one or more transition control or bypass capacitors 170. The capacitor 170 is coupled between the output rail and ground as shown in FIG. 1. Typically, capacitor 170 is physically located adjacent to load 150. Capacitor 170 functions as a high frequency bypass capacitor which controls the noise with respect to ground on the rail and at node 160, such noise being due to the switching transitions of the processor or other load 150 presented to the regulator. Capacitor 170 is typically a low ESR (equivalent series resistance) and/or a low ESL (equivalent series inductance) device. For this reason, when charged, the capacitor is capable of maintaining the voltage at load 150 by becoming a source of current into the load when high frequency load transitions occur. This can occur because of the very low parasitic series resistive and inductive properties of this type of capacitor as compared to the output capacitor 140 discussed below. Capacitor 170 is typically a relatively small capacitor such as 1 to 22μF tantalum or ceramic capacitor.

To address major load fluctuations, such as when the load changes dramatically from, for example, 5A to 35A, regulator 100 employs one or more output capacitors 140 coupled between the output rail and ground as shown. Capacitor 140 typically is a relatively large capacitor such as, for example, an 820 μF to 3900μF high performance aluminum electrolytic capacitor. Capacitor 140 (or multiple capacitors 140) functions as a bulk capacitor or output capacitor for the regulator. Together with inductor 130, capacitor 140 forms an LC filter or tank circuit. When bypass capacitor 170 experiences a transition at the processor rate, it dumps current into the load to control the transition. At the same time, the output capacitor 140 starts to replenish the energy of capacitor 170. This is one of the functions of the output capacitor 140. It is noted that for minor load variations as well, capacitor 140 still replenishes capacitor 170 except to a lesser magnitude according to the lesser needs of 170 during a minor load fluctuation.

To summarize, capacitor 170 provides a substantial energy source during each processor cycle (or other load cycle) independent of average processor load. In between each processor clock cycle there is energy replacement or replenishment from capacitor 140 to capacitor 170 at a somewhat lower transfer rate than the processor consumption rate at processor clock transitions. That replenishment rate is defined mostly by parasitic inductances within capacitor 140 or physical implementation limitations such as printed circuit board (PCB) impedances or connector impedances between 140 and 170, or other parasitic losses. During a very large step load change the amount of energy replenishment from 140 to 170 will be proportional to the magnitude of the step load change.

As load power requirements, and particularly transient current requirements increase, the power loss and noise associated with both the regulator and the parasitic effects occurring in the wires or circuit board traces connecting the regulator to the load become more undesirable. One attempt to reduce the effect of parasitic losses (e.g. resistive and inductive losses) is to locate the regulator (whether a regulator circuit located directly on the system board or a voltage regulator module (VRM) which is a separate circuit board containing all regulator components and connected to the system board in a socket or connector) close to the load, such as a processor. By reducing the length of the conductive path between the output of the regulator and the load, parasitic effects are reduced.

FIG. 2A illustrates the connector layout for a typical multiple-processor system board 200. Processor slot connectors 210, 212, 214, and 216 each can connect one processor card unit to system board 200. VRM connector 220 connects a VRM for supplying regulated power to the processor core of a processor inserted into slot connector 210. Similarly, VRM connectors 222, 224, and 226 are associated with connectors 212, 214, and 216, respectively. VRM connector 221 connects a VRM for supplying regulated power to the level two (L2) cache memory of the processors in slot connectors 210 and 212. VRM connector 225 serves a similar function for processors in slot connector 214 and 216. Connector 230 is for a clustering module so that multiple system boards can be linked together, and VRM connectors 232 and 234 provide for the VRMs needed by the clustering module. System board 200 includes a variety of other features such as I/O bus connectors 240 and 245, memory connectors 250 and 255, and socket 260 for a system board support chip. FIG. 2B shows system board 200 with four processor cartridges 270 installed in the connectors 210, 212, 214, and 216. As illustrated by FIG. 2B, board space is at a premium, particularly because of the size of the processor cartridges and the number of VRMs that must be accommodated.

As illustrated in FIGS. 2A–2B, there are problems associated with locating VRMs or regulator circuitry close to a load device. First, in many computer systems, allocation of system board space for components is tightly controlled. In many computer systems, particularly multiple-processor systems, multiple regulators are required, thereby compounding the board space allocation problem. Moreover, with closely spaced electronic components, cooling the components becomes more difficult, and components that extend up from the system board and hang over other portions of the system board (e.g., slot-based processor cards with attached heat-sinks and fans) often come into contact with other system components. Secondly, if regulators such as VRMs are used, it is difficult to get some regulator components sufficiently close to the load to reduce parasitic losses.

One solution for the problem of allocating system board space is to relocate the regulator to areas of the system board where there is additional space, or to relocate the regulator to a separate circuit board. Clearly, this is counterproductive to efforts to reduce parasitic losses by locating the regulator close to the load. Additionally, if the regulator must be located further away from the load, extra steps need to be taken to compensate for the loss in performance, including, for example adding reservoir capacitors close to the load, and requiring more strict performance tolerances of the regulator, both of which add complexity and cost to any design.

Accordingly, it is desirable to have a DC to DC regulator that uses a relatively small amount of system board space, yet is located sufficiently close to a load so as to reduce power loss and noise associated with the known parasitic effects.

SUMMARY OF THE INVENTION

It has been discovered that by separating a power regulator at a point between the output inductor and the output capacitor of the regulator, the capacitive output section can be located close to a processor (or other load device) while the remaining portion of the regulator can be placed in another location away from the processor. With the capacitive output section located close to the processor, valuable system board space can be saved and parasitic losses can be reduced. By implementing the sectionalized power regulator, parasitic losses are more manageable than with prior art designs because the parasitic losses occur largely before the output capacitor.

Accordingly, one aspect of the present invention provides a sectionalized power regulator including a primary regulator section and a secondary regulator section. The primary regulator section includes a first voltage input terminal, a first voltage output terminal, a first transistor coupled to the first voltage input, and an inductor coupled between the first transistor and the first voltage output terminal. The secondary regulator section is separated from the primary regulator section and is operable to be located in close proximity to a load device. The secondary regulator section includes a second voltage output terminal coupled to the first voltage output terminal of the primary regulator section and operable to be coupled to the load device. The secondary regulator section also includes an output capacitor coupled between the second voltage output terminal and ground, and a bypass capacitor coupled between the second voltage output terminal and ground.

In another aspect of the invention, a computer system includes a processor, a memory coupled to the processor, a power plane for supplying power to a portion of the computer system, and a sectionalized power regulator. The sectionalized power regulator has a primary regulator section and a secondary regulator section separated from the primary regulator section and located in close proximity to a load device. The primary regulator section includes a first voltage input terminal, a first voltage output terminal, a first transistor coupled to the first voltage input, and an inductor coupled between the first transistor and the first voltage output terminal. The secondary regulator section includes a second voltage output terminal coupled to the first voltage output terminal of the primary regulator section and coupled to the power plane. The second regulator section also includes an output capacitor coupled between the second voltage output terminal and ground, and a bypass capacitor coupled between the second voltage output terminal and ground.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
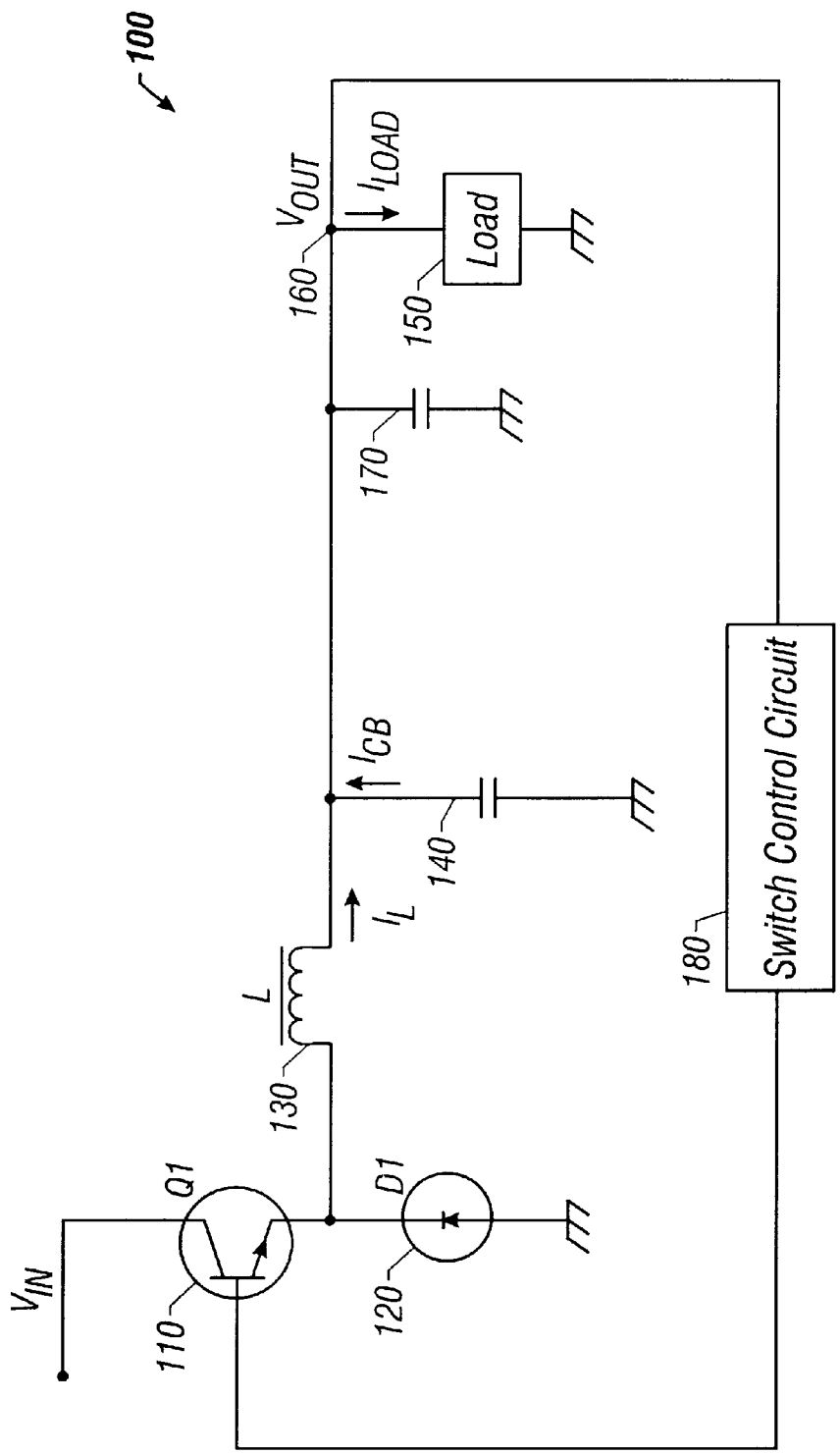
FIG. 1, labeled Prior Art, is a block diagram illustrating a conventional DC to DC regulator.
Figure 2B:
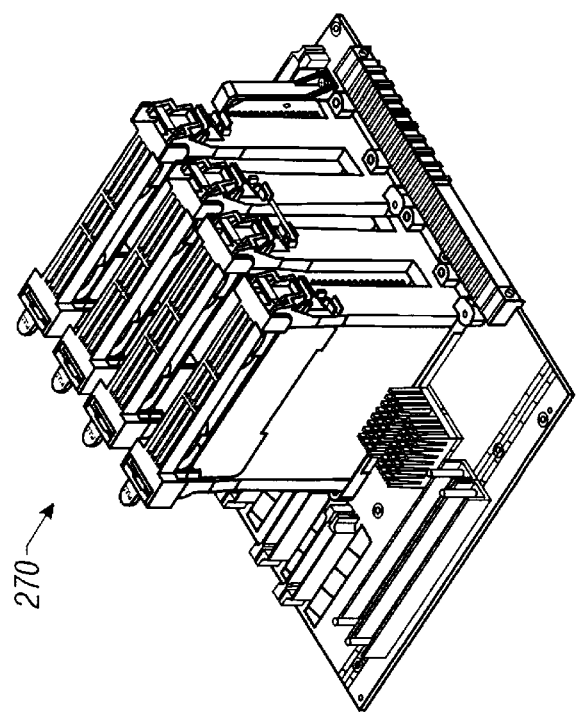
FIGS. 2A–2B, labeled Prior Art, show two views of multiple-processor system boards.
Figure 2A:
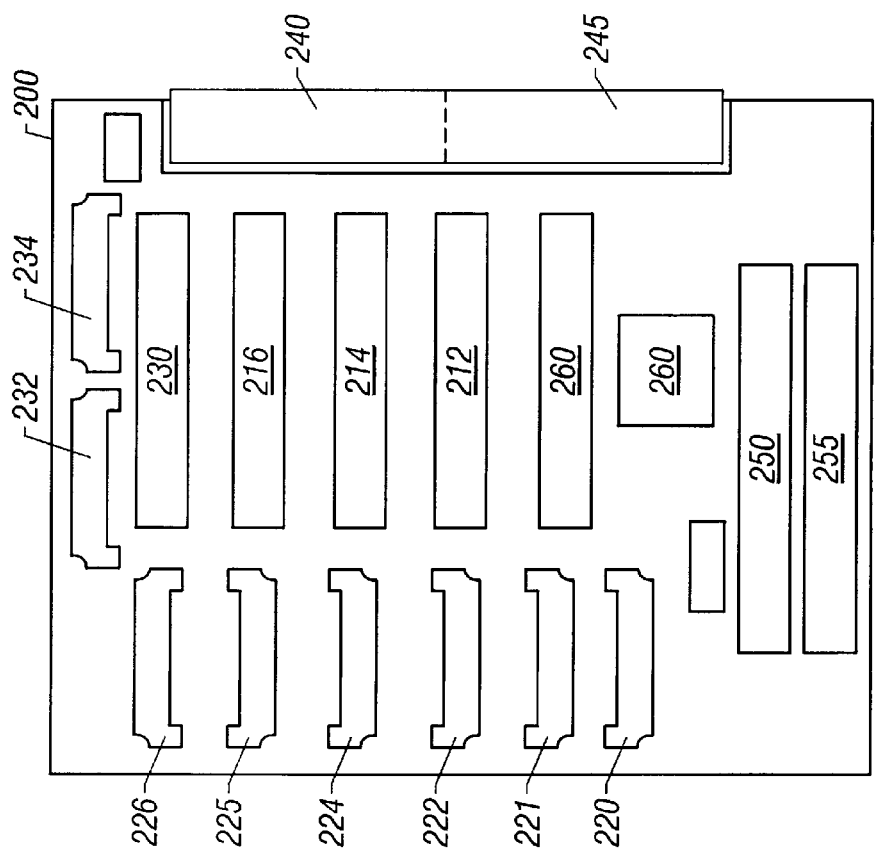
Figure 3:
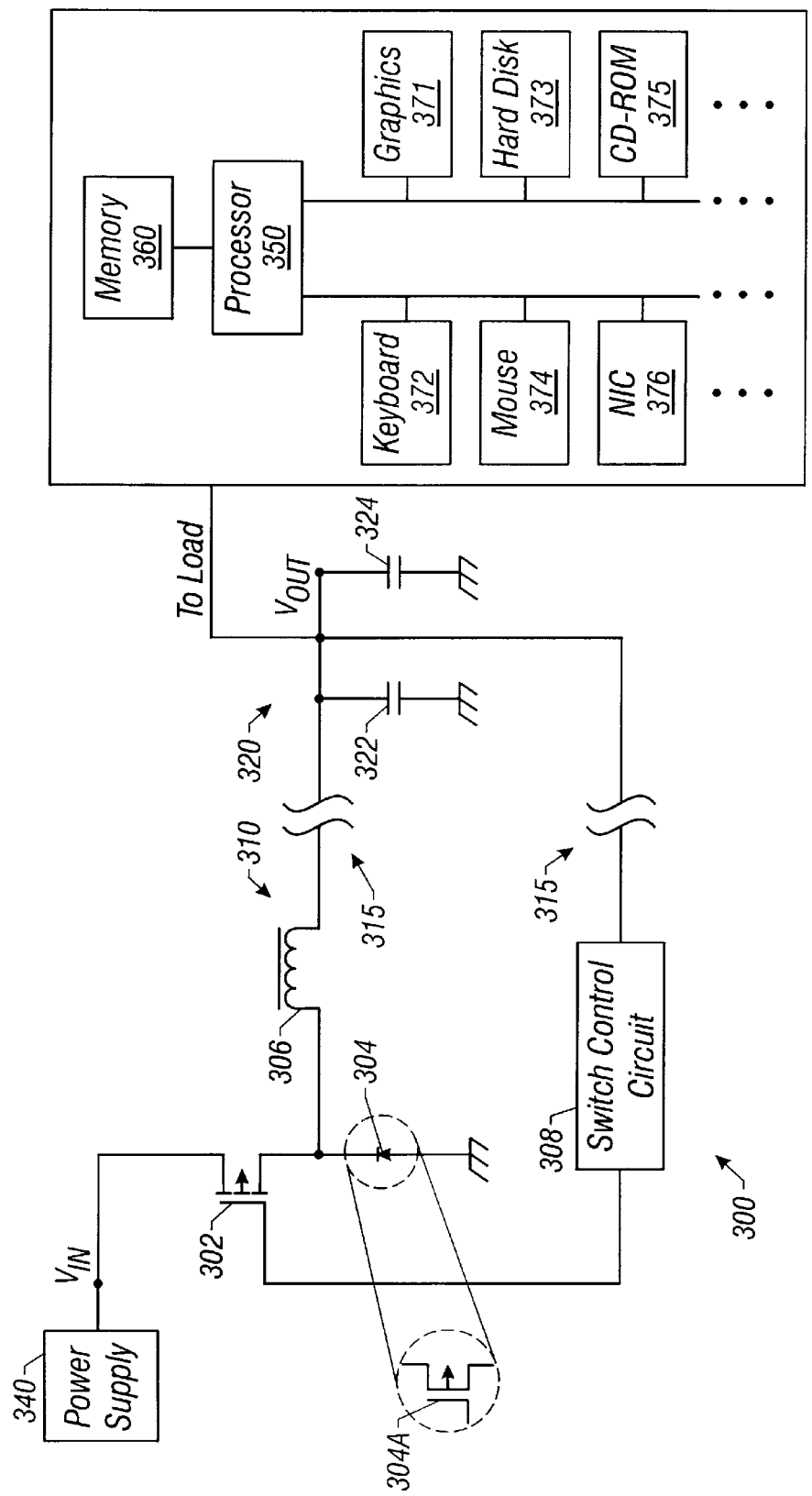
FIG. 3 is a block diagram illustrating a sectionalized power regulator that is part of a computer system.

FIG. 3 illustrates sectionalized power regulator 300 coupled to a computer system. Regulator 300 has a primary regulator section 310 including switching transistor 302, free-wheeling diode 304, inductor 306, and switch control circuit 308. Sectionalized power regulator 300 also has a secondary regulator section 320 including output capacitor 322 and bypass capacitor 324.

Power supply 340 provides DC current to regulator 300 at the drain of transistor 302, which is illustrated as an enhancement mode MOSFET. Diode 304 is coupled between the source of transistor 302 and ground. Inductor 306 is coupled between the output of the primary regulator section and the common node between transistor 302 and diode 304. Switch control circuit 308 (e.g., a pulse width modulator integrated circuit, or a voltage controlled oscillator) senses an output voltage either at secondary regulator section voltage output (as shown), or alternately at the voltage output of the primary regulator section. Switch control circuit 308 senses the output voltage as the load (in this example one or more of the illustrated computer system components 350–376) varies and appropriately adjusts the switching frequency of transistor 302 by, for example, adjusting the pulse width of the control signal applied to switching transistor 302 to dynamically regulate the output voltage to the desired value. Additionally, diode 304 can be replaced by some other device, such as another transistor 304A. In such cases, switch control circuit 308 may provide the needed activating and deactivating signals to both transistors, or some additional control circuitry may be added.

Separation 315 illustrates that primary regulator section 310 and secondary regulator section 320 are separated from each other so that secondary regulator section 320 can be located in close proximity to a load device. Separation 315 can manifest itself by locating the primary and secondary regulator sections on different portions of the same system board, on separate circuit boards, or even when the primary regulator section is located on the system board and the secondary regulator section is located with the load device itself (e.g., on a processor cartridge with the processor). Electrical continuity between the section 310 and 320 can be provided by a conductive traces on the various circuit boards (e.g., a trace sandwiched between conductive planes in a printed circuit board, the conductive planes effectively shielding the trace), wires, connectors, cables, or some combination thereof. Output capacitor 322 and bypass capacitor 324 generally serve functions as described for capacitors 140 and 170, respectively. Note also that although only one of each type of capacitor (output and bypass) is illustrated in FIG. 3, multiple capacitors, of varying types can be used.

The computer system illustrated in FIG. 3 includes processor 350, memory 360 coupled to the processor, and a variety of additional components coupled to the processor such as keyboard 372, mouse 374, network interface card (NIC) 376, graphics adapter 371, hard disk drive 373, and CD-ROM drive 375. As demonstrated by the ellipses shown in the figure, the computer system can include a variety of other components (e.g., storage devices, communications devices, input devices and output devices) as is well known to those having ordinary skill in the art. Additionally, sectionalized power regulator 300 can be used in a variety of computer systems including portable computer systems (e.g. laptops, notebooks, sub-notebooks, and palmtops), desktop computer systems, workstations, and servers, as well as in a variety of other electronic devices.

Although FIG. 3 illustrates a buck topology switching regulator, those having ordinary skill in the art will readily recognize that the a variety of different regulator types (both linear and switching) can be sectionalized as described. Additionally, the sectional power regulator can be implemented in a multi-phase scheme where there are two or more regulating stages among which the load power requirements are shared. An example of one type of multi-phase regulator that could be implemented in the sections taught above can be found in U.S. patent application Ser. No. 09/013,969, entitled *Computer System with Improved DC to DC Power Conversion Employing Capacitive Energy Storage Reservoirs,* filed by Alan E. Brown on Jan. 27, 1998, which is incorporated herein by reference. The sectional power regulator can also be implemented using only the dual function capacitors taught in the aforementioned patent application (e.g., replacing the output capacitor and the bypass capacitor of the present invention with one or more dual function capacitors).

Figure 4B:
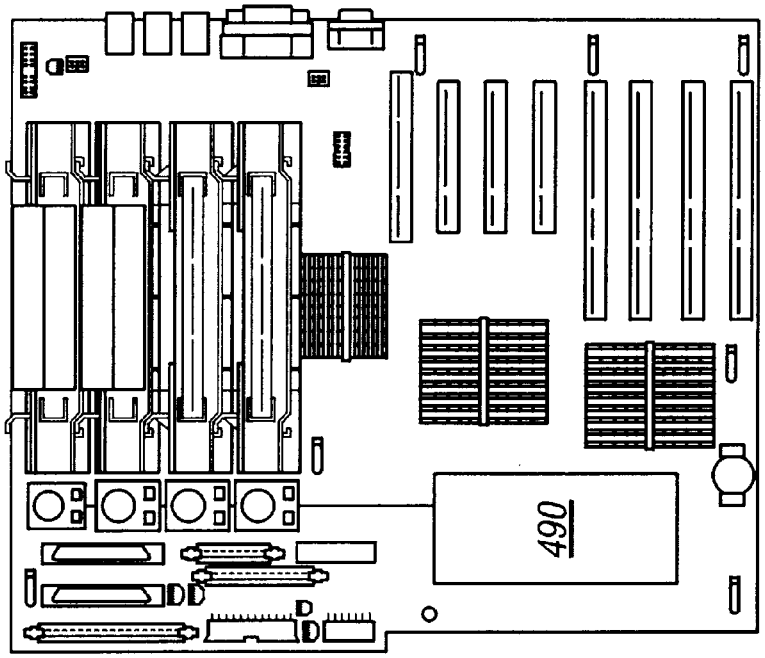
FIGS. 4A–4B show multiple-processor system boards that utilized a sectionalized power regulator.
Figure 4A:
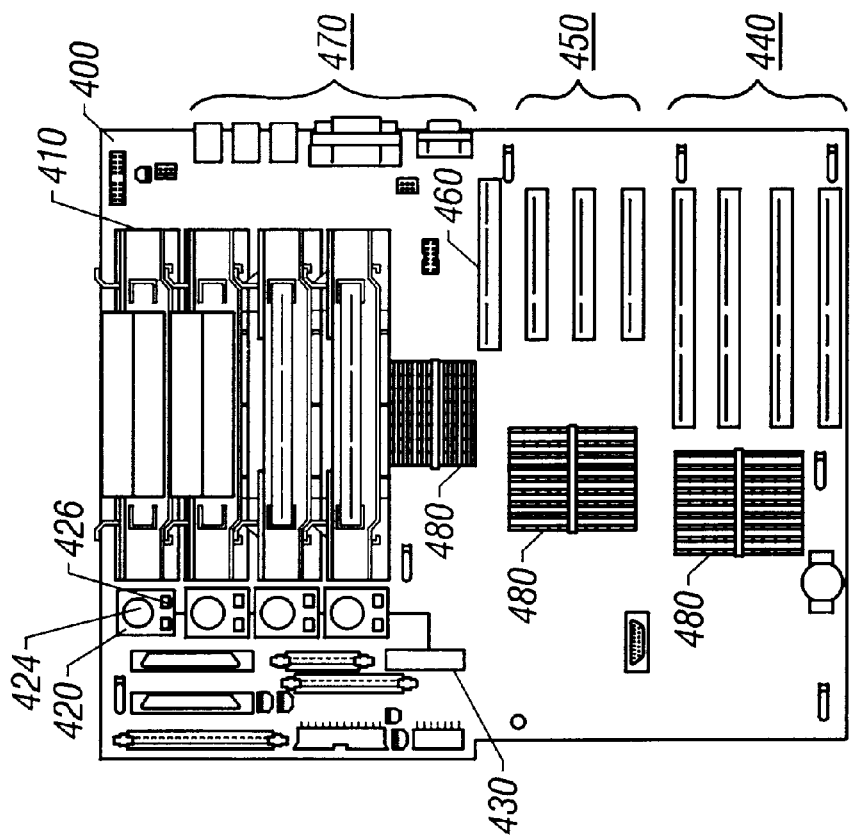

FIGS. 4A–4B show two examples of implementing the sectional power regulator on a multiple-processor system board. In FIG. 4A, system board 400 includes connectors for four processor cartridges, two of which are shown installed (410). Secondary regulator sections 420 (four sections for four different regulators) are located in close proximity to processor cartridges 410 and include output capacitors 424 and bypass capacitors 426. The various components of the secondary regulator sections are coupled to power cable connector 430 which is coupled to a separate circuit board that includes primary regulator sections (not shown). Although the components of the secondary regulator section are all shown having a similar layout with respect to the load device, the components can be located in a variety of different places (e.g. staggered on opposite sides of each of the processor cartridges) so long as they remain in close proximity to the load device. System board 400 also includes a variety of other components, such as bus connectors 440, memory connectors 450, video connector 460, I/0 connectors 470, and system board support chips 480. FIG. 4B is similar to FIG. 4A, but with the components of secondary regulator sections 420 being coupled to primary regulator sections 490, which are separated from the processor cartridges, but still located on system board 400.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A sectionalized power regulator comprising:
    a primary regulator section including:
        a first voltage input terminal;
        a first voltage output terminal;
        a first transistor coupled to the first voltage input terminal;
        an inductor coupled between the first transistor and the first voltage output terminal; and
    a secondary regulator section separated from the primary regulator section and operable to be located in close proximity to a load device, the secondary regulator section including:

a second voltage output terminal coupled to the first voltage output terminal of the primary regulator section and operable to be coupled to the load device;

an output capacitor coupled between the second voltage output terminal and ground; and a bypass capacitor coupled between the second voltage output terminal and ground.

2. The sectionalized power regulator of claim 1 wherein the primary regulator section further comprises at least one of a diode and a second transistor coupled between the first transistor and ground.

3. The sectionalized power regulator of claim 1 wherein the primary regulator section further comprises a switch control circuit coupled from one of the first voltage output terminal and the second voltage output terminal to the first transistor, and operable to provide one of an activating and a deactivating signal to the first transistor.

4. The sectionalized power regulator of claim 3 wherein the switch control circuit is a pulse width modulated switch control circuit.

5. The sectionalized power regulator of claim 1 wherein the inductor of the primary regulator section and the output capacitor of the secondary regulator section form a tank circuit.

6. The sectionalized power regulator of claim 1 wherein the primary regulator section and the secondary regulator section are located on a single circuit board.

7. The sectionalized power regulator of claim 6 wherein the second voltage output terminal is coupled to the first voltage output terminal through a circuit board trace.

8. The sectionalized power regulator of claim 1 wherein the primary regulator section is located on a first circuit board, and the secondary regulator section is located on a second circuit board.

9. The sectionalized power regulator of claim 8 wherein the second voltage output terminal is coupled to the first voltage output terminal through at least one of a connector and a cable.

10. The sectionalized power regulator of claim 1 wherein the secondary regulator section and the load device are located on a single circuit board.

11. The sectionalized power regulator of claim 1 wherein the output capacitor and the bypass capacitor are each one of an electrolytic, a tantalum, and a ceramic capacitor.

12. The sectionalized power regulator of claim 1 wherein the bypass capacitor is at least one of a low equivalent series resistance (ESR) device and a low equivalent series inductance (ESL) device.

13. A computer system comprising:

a processor;

a memory coupled to the processor;

a power plane for supplying power to a portion of the computer system; and a sectionalized power regulator comprising:

a primary regulator section including:

a first voltage input terminal;

a first voltage output terminal;

a first transistor coupled to the first voltage input terminal;

an inductor coupled between the first transistor and the first voltage output terminal; and a secondary regulator section separated from the primary regulator section and located in close proximity to a load device, the secondary regulator section including:

a second voltage output terminal coupled to the first voltage output terminal of the primary regulator section and coupled to the power plane;

an output capacitor coupled between the second voltage output terminal and ground; and a bypass capacitor coupled between the second voltage output terminal and ground.

14. The computer system of claim 13 wherein the portion of the computer system includes the load device.

15. The computer system of claim 13 wherein the load device is the processor.

16. The computer system of claim 13 wherein the primary regulator section further comprises at least one of a diode and a second transistor coupled between the first transistor and ground.

17. The computer system of claim 13 wherein the primary regulator section further comprises a switch control circuit coupled from one of the first voltage output terminal and the second voltage output terminal to the first transistor, and operable to provide one of an activating and a deactivating signal to the first transistor.

18. The computer system of claim 13 wherein the primary regulator section and the secondary regulator section are located on a single circuit board.

19. The computer system of claim 13 wherein the primary regulator section is located on a first circuit board, and the secondary regulator section is located on a second circuit board.

20. The computer system of claim 13 wherein the secondary regulator section and the load device are located on a single circuit board.

21. The computer system of claim 13 wherein the output capacitor and the bypass capacitor are each one of an electrolytic, a tantalum, and a ceramic capacitor.

22. The computer system of claim 13 wherein the bypass capacitor is at least one of a low equivalent series resistance (ESR) device and a low equivalent series inductance (ESL) device.

* * * * *